US012003002B2

(12) United States Patent
Yaokawa et al.

(10) Patent No.: US 12,003,002 B2
(45) Date of Patent: Jun. 4, 2024

(54) POWER GENERATION APPARATUS AND POWER GENERATION METHOD

(71) Applicant: KABUSHIKI KAISHA TOYOTA CHUO KENKYUSHO, Nagakute (JP)

(72) Inventors: Jun Yaokawa, Nagakute (JP); Kazuma Hibi, Nagakute (JP); Takuma Minoura, Nagakute (JP); Hiroshi Kawahara, Nagakute (JP); Yasushi Iwata, Nagakute (JP)

(73) Assignee: KABUSHIKI KAISHA TOYOTA CHUO KENKYUSHO, Nabushiki (JP)

( * ) Notice: Subject to any disclaimer, the term of this patent is extended or adjusted under 35 U.S.C. 154(b) by 294 days.

(21) Appl. No.: 17/347,965

(22) Filed: Jun. 15, 2021

(65) Prior Publication Data

US 2022/0140356 A1    May 5, 2022

(30) Foreign Application Priority Data

Nov. 2, 2020   (JP) .................................. 2020-183395

(51) Int. Cl.
*H01M 6/14*     (2006.01)
*C25C 3/24*     (2006.01)
(Continued)

(52) U.S. Cl.
CPC ................. *H01M 6/14* (2013.01); *C25C 3/24* (2013.01); *H01M 4/463* (2013.01); *H01M 4/483* (2013.01);
(Continued)

(58) Field of Classification Search
CPC ..... H01M 4/06–08; H01M 4/134–136; H01M 4/1395; H01M 4/46; H01M 6/14;
(Continued)

(56) References Cited

U.S. PATENT DOCUMENTS 4,097,270 A     6/1978  Rao et al.
4,214,956 A  *  7/1980  Bowman ................... C25C 3/00
                                                   205/377
(Continued)

FOREIGN PATENT DOCUMENTS

JP       H10104196 A  *  4/1998  ............... C22C 1/02
JP       2007-154268 A    6/2007
(Continued)

OTHER PUBLICATIONS

Machine translation of Kurashima, JP 10-104196. Originally available Apr. 24, 1998. (Year: 1998).*

(Continued)

*Primary Examiner* — Jonathan Crepeau
*Assistant Examiner* — Jacob Buchanan
(74) *Attorney, Agent, or Firm* — Oliff PLC (57) ABSTRACT

An object provides a power generation apparatus performing the purification of an Al alloy melt using scrap as raw material. A power generation apparatus includes: a container body with aluminum alloy melt and molten salt in a liquid junction with the aluminum alloy melt; an anode which is in contact with the aluminum alloy melt; and a cathode which is in contact with the molten salt. DC power is obtained from between the anode and the cathode by an anode reaction on the aluminum alloy melt side and a cathode reaction on the molten salt side. When the aluminum alloy melt and the molten salt are separated by a separator allowing ionic conduction between the aluminum alloy melt and molten salt, the power generation efficiency is enhanced. The amount of a reactant in the Al alloy melt is monitored by measuring the electrical quantity associated with the power generation.

15 Claims, 4 Drawing Sheets

(51) Int. Cl.
*H01M 4/46* (2006.01)
*H01M 4/48* (2010.01)
*H01M 4/58* (2010.01)
*H01M 6/50* (2006.01)

(52) U.S. Cl.
CPC ............ *H01M 4/582* (2013.01); *H01M 6/50* (2013.01); *H01M 2300/0048* (2013.01); *H01M 2300/0057* (2013.01)

(58) Field of Classification Search
CPC ............ H01M 6/24; H01M 6/30; H01M 6/50; H01M 6/5038–5044; H01M 6/52; C22C 1/00; C22C 1/02–03; C22C 1/057; C22C 1/059; C22C 1/1036–1052; C22C 1/1078; C22C 3/00–005; C22C 21/00–006; C22C 21/06–08; C22C 21/12–18; C25C 3/04–125; C25C 3/18; C25C 3/24
See application file for complete search history.

(56) References Cited

U.S. PATENT DOCUMENTS

| | | | | |
|---|---|---|---|---|
| 5,500,100 A | * | 3/1996 | Riley | ...................... C22B 26/22 205/404 |
| 5,976,345 A | * | 11/1999 | Pal | ........................... C25C 7/06 204/243.1 |
| 2015/0225864 A1 | * | 8/2015 | Gesing | ................... C04B 35/634 204/243.1 |
| 2023/0043661 A1 | | 2/2023 | Minoura et al. | |

FOREIGN PATENT DOCUMENTS

| | | |
|---|---|---|
| JP | 2008-050637 A | 3/2008 |
| JP | 2011-168830 A | 9/2011 |
| JP | 2021-110026 A | 8/2021 |

OTHER PUBLICATIONS

Mar. 28, 2023 Office Action issued in Japanese Patent Application No. 2020-183395.

Katsuhisa Nagayama et al.; "Demagging processes by fluxing from aluminum alloys"; Journal of Japan Institute of Light Metals; 1983; vol. 33; pp. 243-248.

Masanori Tsunekawa; "Refining processes of molten aluminum using solid flux"; Journal of Japan Institute of Light Metals; 2004; vol. 54; pp. 75-81.

* cited by examiner

POWER GENERATION APPARATUS AND
POWER GENERATION METHOD

TECHNICAL FIELD

The present invention relates to an apparatus that performs power generation using an electrochemical reaction and relates also to relevant techniques.

BACKGROUND ART

There are various principles and schemes for power generation that generates electrical power essential for industrial activities, daily life, etc. For example, power generation is performed by power generators (electric motors) using electromagnetic induction as well as physical batteries using a photovoltaic effect, a Seebeck effect, or the like, chemical batteries using an electrochemical reaction, etc.

Among these, chemical batteries convert chemical energy changes of substances that occur with chemical reactions (such as redox reactions) into DC power to perform efficient power generation. Chemical batteries include primary batteries and secondary batteries that contain a certain amount of active substances (active materials) and fuel batteries that can be replenished (supplied) with active substances.

PRIOR ART DOCUMENTS

Patent Documents

[Patent Document 1] U.S. Pat. No. 4,097,270B
[Patent Document 2] JP2007-154268A
[Patent Document 3] JP2008-50637A
[Patent Document 4] JP2011-168830A Non-Patent Documents

[Non-Patent Document 1] Journal of Japan Institute of Light Metals, vol. 33 (1983), pp. 243-248
[Non-Patent Document 2] Journal of Japan Institute of Light Metals, vol. 54 (2004), pp. 75-81

SUMMARY OF INVENTION

Technical Problem

Thus, various types of chemical batteries have been put into practical use, but at present, there is not found any specific proposal for power generation using an aluminum alloy melt. The present invention has been made in view of such circumstances, and an object of the present invention is to provide a novel power generation apparatus and relevant techniques using an aluminum alloy melt.

With the heightened environmental awareness, not only the use of lightweight aluminum-based members are promoted, but also the promotion of reuse of the scrap is important. Many proposals have been made regarding the recycling of aluminum-based scrap, and relevant descriptions are found, for example, in the above documents. Unsurprisingly, none of the documents describes performing power generation in parallel to the recycling and refining of aluminum (alloy) or the like.

Solution to Problem

As a result of intensive studies, the present inventors have succeeded in power generation through preparing an aluminum alloy melt and a molten salt that are in a liquid junction with each other and using chemical reactions (anode-cathode reactions/redox reactions) that occur in the aluminum alloy melt and the molten salt. Developing this achievement, the present inventors have accomplished the present invention, which will be described hereinafter.

«Power Generation Apparatus»

(1) The present invention provides a power generation apparatus comprising: a container body containing an aluminum alloy melt and a molten salt that is in a liquid junction with the aluminum alloy melt; an anode at least a part of which is in contact with the aluminum alloy melt; and a cathode at least a part of which is in contact with the molten salt. In this power generation apparatus, DC power is obtained from between the anode and the cathode by an anode reaction on the aluminum alloy melt side and a cathode reaction on the molten salt side.

(2) According to the power generation apparatus of the present invention, DC power can be obtained, which is output between the anode provided on the aluminum alloy melt side and the cathode provided on the molten salt side. The reasons for this are considered as follows.

When the aluminum alloy melt (also simply referred to as an "Al alloy melt/aluminum-based molten metal") and the molten salt are in liquid junction with each other so as to be capable of ionic conduction, the cathode reaction of a cathode active substance (e.g., an elementary substance such as Cu, Zn, or Mn or its alloy or compound) contained in the molten salt can occur along with the anode reaction of an anode active substance (e.g., an elementary substance such as Mg, Na, Li, or Al or its alloy or compound) contained in the Al alloy melt.

When respective electrodes are provided on the Al alloy melt side and the molten salt side, the chemical energy generated by each reaction is taken out as electrical energy (electrical power) from the Al alloy melt side electrode (anode) and the molten salt side electrode (cathode).

Provided that the Al alloy melt and the molten salt are in a liquid-junction state (state in which ionic conduction is possible) and the active substances are present, each reaction can be continued (sustained). That is, predetermined electromotive force is output even after energization, and stable power generation can be performed. Moreover, long-term power generation is possible by replenishment/resupply or the like of the active substances. Furthermore, when inexpensive scrap, oxide, or the like is used as the raw material containing an active substance, the power generation cost can be reduced.

The anode active substance element (including Al) in the Al alloy melt is consumed by the power generation, and the concentration change (including removal) may occur. The power generation apparatus of the present invention can therefore be considered also as a melt processing apparatus that performs removal or adjustment of the concentration of an element contained in the Al alloy melt. Additionally or alternatively, the melt processing apparatus may be considered also as a purification apparatus if the element to be removed or reduced in its concentration is an impurity.

As a matter of course, it appears that the same applies to the cathode active substance in the molten salt. That is, the cathode active substance element in the molten salt is consumed by the power generation, and the concentration change (including precipitation or deposition) of the element may occur. The power generation apparatus of the present invention can therefore be considered also as a processing apparatus that performs the concentration adjustment, precipitation or deposition, recovery, or the like of an element contained in the molten salt. For example, when an inexpensive compound (such as oxide or halide) is used as the raw material for the cathode active substance, a noble metal that is the cathode active substance can be precipitated or deposited (isolated) and recovered.

«Tower Generation Method»

The present invention is perceived also as a power generation method. For example, the present invention may provide a power generation method comprising: preparing an aluminum alloy melt and a molten salt that are in a liquid junction with each other; and individually providing respective electrodes that are in contact with the aluminum alloy melt and the molten salt. In this power generation method, DC power is obtained by an anode reaction on the aluminum alloy melt side and a cathode reaction on the molten salt side.

«Others»

(1) In the present specification, the anode reaction is referred to as "oxidation (reaction)," the cathode reaction is referred to as "reduction (reaction)," and both are collectively referred to as "redox (reaction)," as appropriate. The "oxidation" and "reduction" as referred to in the present specification mean reactions that involve the transfer of electrons and do not necessarily mean the involvement of O in the reaction.

Unless otherwise stated, the concentration and composition as referred to in the present specification are indicated by the mass ratio (mass %) of an object (such as melt or molten salt) to the whole. Mass % is simply indicated by "%" as appropriate. "X-based" materials include not only an X alloy/compound that contains X as the main component (content with respect to the whole is more than 50%) but also the elementary substance of X. The Al alloy melt usually contains 60% or more of Al in an embodiment or 75% or more of Al in another embodiment with respect to the melt as a whole.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit.

EMBODIMENTS FOR CARRYING OUT THE INVENTION

One or more features freely selected from the present specification can be added to the above-described features of the present invention. The content described in the present specification can be features regarding a product even when the content represents methodological features.

«Al Alloy Melt»

The Al alloy melt is not limited in the specific composition of components, the type of a raw material used for preparing the melt, or the like. Scrap of an Al-based member may be used as a raw material for the Al alloy melt to promote the application and regeneration.

When the Al alloy melt contains one or more types of metal elements α (such as Mg, Na, and Li, for example) that are less noble than Al, they can be raw materials (anode active substances) for anode reactions (such as $\alpha \to \alpha^{2+}+2e^-$ and $\alpha \to \alpha^++e^-$). The metal elements (α) are ionized to migrate into to the molten salt decreasing the concentration in the Al alloy melt depending on the amount of power generation.

Mg, which is a type of the metal elements (α), is a typical alloy element of aluminum alloys (also simply referred to as "Al alloys") and is contained in many Al alloys (such as 5000 series, 6000 series, and 7000 series). Na is contained in cryolite ($Na_3AlF_6$) that is used when smelting aluminum from alumina (Hall-Héroult method). The power generation apparatus (method) of the present invention can therefore perform not only the power generation but also refining and regeneration of Al alloy as well as smelting of Al. When the Al alloy melt does not contain a metal element a that is less noble than Al, Al is a raw material (anode active substance) for the anode reaction ($Al \to Al^{3+}+3e^-$).

The Al alloy melt may contain one or more types of metal elements β (such as Fe, Mn, Si, Cu, and Zn, for example) that are nobler than Al. The metal elements β cannot be anode active substances, but are concentrated in the Al alloy melt with the power generation. As a result, for example, Fe and Mn are likely to form compounds by concentration, and they can be removed from the Al alloy melt by sedimentation or the like or can reduce the concentration in the Al alloy melt.

The Al alloy melt can also be perceived as a conductor responsible for electron conduction. Additionally or alternatively, when the Al alloy melt contains an anode active substance other than Al, it can also be perceived as a current collector (electrode). Additionally or alternatively, when Al itself is considered as an anode active substance, the Al alloy melt can also be perceived as a supply source for the anode active substance. The Al alloy melt may be in a solid-liquid coexisting state (semi-molten state). This also applies to the molten salt.

Figure 6:
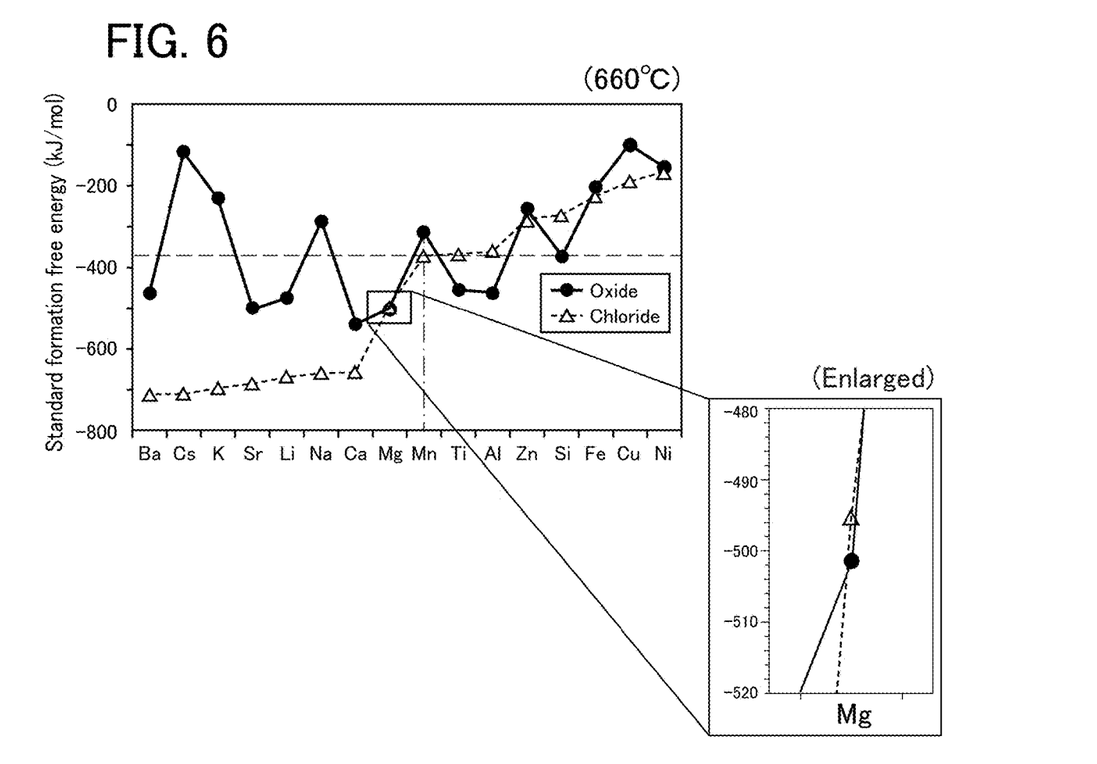
FIG. 6 is a standard formation free energy diagram of metal oxides and metal chlorides at 660° C.

The "noble/less noble" metal element as referred to in the present specification is determined based on the standard formation free energy (see FIG. 6) in the molten salt in contact with the Al alloy melt. As the absolute value of negative standard formation free energy increases, the metal element is less noble. In FIG. 6, representative metals (elementary substances) are arranged from the left in the order of less noble state in the chloride molten salt. The standard formation free energy not illustrated in FIG. 6 may be obtained from a data collection or potential measurement.

«Molten Salt»

The molten salt serves as an electrolyte. The molten salt (fused salt) is also not limited in the specific composition of components, the type of a raw material used for preparing the molten salt, or the like. As the molten salt, for example, a halide salt, a carbonate, or the like can be used. When a halide (in particular, chloride or bromide) is used, a stable molten salt can be prepared at low cost.

More specifically, for example, the base material of a molten salt may be a halide of a metal element (one or more of Ca, Na, Li, Sr, K, Cs, Ba, and other similar elements) whose standard formation free energy (see FIG. 6), which will be described later, is smaller than that of Mg halides. In particular, halides of Na and/or K are inexpensive and stable and therefore suitable as the base material of a molten salt. The molten salt may be a single type salt or may otherwise be a plurality of types of salts (mixed salts). A plurality of halide salts can be combined thereby to lower, for example, the melting point of the molten salt.

When the molten salt contains a metal element (β) that is nobler than Al, it can be a raw material (cathode active substance) for a cathode reaction (such as $β^{2+}+2e^-→β$ or $β^++e^-→β$). The metal element (β) can be deposited on the cathode (or precipitated in the vicinity of the cathode), for example, depending on the amount of power generation.

The metal element (β) is, for example, Cu, Sn, Fe, Zn, Mn, or the like. The metal element (β) is supplied, for example, as an elementary substance, a compound, or the like to the molten salt. When using a compound of the metal element (β), the raw material cost required for the power generation can be reduced. Examples of such a compound include oxides and halides (in particular, chlorides). In general, when using an oxide rather than a halide, the raw material cost can be more reduced. Moreover, when using an oxide of the metal element (β), the element (such as Mg) contained in the Al alloy melt can be easily removed as an oxide (such as MgO).

Furthermore, the metal element (β) may be preferably a specific metal element (M) that is one or more of Cu, Zn, or Mn (in particular, Cu). The standard formation free energy of an oxide of the specific metal element is larger than or approximately the same as the standard formation free energy of its halide (in particular, a chloride) (see FIG. 6). The oxide (such as CuO, ZnO, or MnO) of the specific metal element (M) is therefore easily decomposed in the molten salt composed of the halide. As a result, the specific metal element (M) is deposited on the cathode, for example, and O can remove ions (such as $Mg^{2+}$) that have migrated from the Al alloy melt, as oxides. An example of the reaction is represented by a reaction formula 1: $MO+MgX_2→MX_2+MgO$ (X: halogen element, in particular, Cl or Br).

$MX_2$ in the molten salt reacts as in a reaction formula 2: $MX_2+Mg→M+MgX_2$, for example, and also serves as an Mg removing material. It can be found from FIG. 6 that, in any of the reaction formulas, the reaction is likely to proceed in a stable direction in which the free energy difference is negative ($ΔG<0$), that is, from the left side to the right side. The amount of Mg removed from the Al alloy melt varies depending on the amount of oxide (MO) supplied (added) to the molten salt, but the amount of $MgX_2$ in the molten salt ($Mg^{2+}$ concentration in the molten salt) is approximately constant.

The standard formation free energy (also simply referred to as "free energy") illustrated in FIG. 6 relies on Knacke O., Kubaschwski O., Hesselmann K., "Thermochemical Properties of Inorganic Sub stances" (1991), SPRINGER-VERLAG. FIG. 6 illustrates each free energy at 660° C., but the tendency is the same as that of each free energy at least at 660° C. to 800° C.

«Electrodes»

(1) Current Collectors

The power generation apparatus of the present invention is also considered as a type of a galvanic battery. Therefore, to extract as the electrical energy the chemical energy released when the anode active substance on the Al alloy melt side and the cathode active substance on the molten salt side undergo a redox reaction, the Al alloy melt side and the molten salt side may be preferably provided with respective independent electrodes. That is, it is preferred to independently provide an anode (a negative electrode) on the Al alloy melt side and a cathode (a positive electrode) on the molten salt side.

Each electrode may be preferably composed of a current collector at least a part of which is in contact with the aluminum alloy melt or molten salt. The current collector may be preferably composed of a material that does not adversely affect the redox reaction. For example, the current collector (electrode) can be a graphite electrode (such as a graphite rod or a graphite plate) that is excellent in the heat resistance and corrosion resistance and is relatively inexpensive.

When a part of the anode passes through the molten salt, it is preferred to provide a covering member or a covering layer on the outer peripheral side of the anode to electrically insulate the anode from the molten salt. When both are in a conductive (short-circuited) state, a cathode reaction (deposition or precipitation of the cathode active substance (such as Cu)) may occur on or near a part of the anode to lower the power generation efficiency. The material of the covering member or covering layer is not limited, provided that the anode and the molten salt are insulated from each other. As the material, for example, an insulating material such as ceramics may be preferably used. Likewise, when the cathode passes through the Al alloy melt, it is preferred that both be electrically insulated from each other.

(2) Terminals

The electrodes (current collectors) can be used as output terminals that are connected to an external circuit without any modification. Fortunately, however, when output terminals are provided separately from the electrodes, not only the connectivity with the external circuit is improved, but also it is easy to replace only a consumable electrode. Therefore, an anode terminal that is linked to the anode and can be connected to an external circuit and a cathode terminal that is linked to the cathode and can be connected to the external circuit may be further provided. Both terminals may be preferably composed of the same material (metal).

(3) Supply Means

It is preferred to provide a supply means that supplies a raw material causing the cathode reaction (raw material of the cathode active substance) to the periphery of the cathode. The supply means is, for example, a liquid-permeable enclosure or the like provided around the cathode. This can concentrate the cathode active substance around the cathode and enhance the power generation efficiency. The supply means may be integrated with the cathode or may otherwise be separate from the cathode.

«Separator»

In general, the Al alloy melt and the molten salt are naturally in a two-layer (two-phase) state (the upper/lower layer is determined by each density). Therefore, the power generation apparatus of the present invention can be realized without necessarily having a separator, unlike a battery using two types of aqueous solutions as the electrolytic liquids. However, if the Al alloy melt and the molten salt come into direct contact with each other, precipitation of the cathode active substance due to the redox reaction may occur in the vicinity of the contact interface between the two. It is therefore preferred to provide a separator that separates the aluminum alloy melt and the molten salt from each other while allowing ionic conduction between the aluminum alloy melt and the molten salt. This allows the stable power generation to be efficiently performed.

The separator may be a partition wall extending in the longitudinal direction (vertical direction) (simply referred to as a "longitudinal wall") or may otherwise be a partition wall extending in the lateral direction (horizontal direction) (simply referred to as a "lateral wall"). When the separator is a longitudinal wall, the supply, replenishment, or the like of the raw materials can be performed from each of the upper surfaces of the Al alloy melt and molten salt.

The separator may also serve as a container body that contains the Al alloy melt or the molten salt. In this case, it suffices that at least a part of the wall surface of the container body is capable of ionic conduction.

Figure 2A:
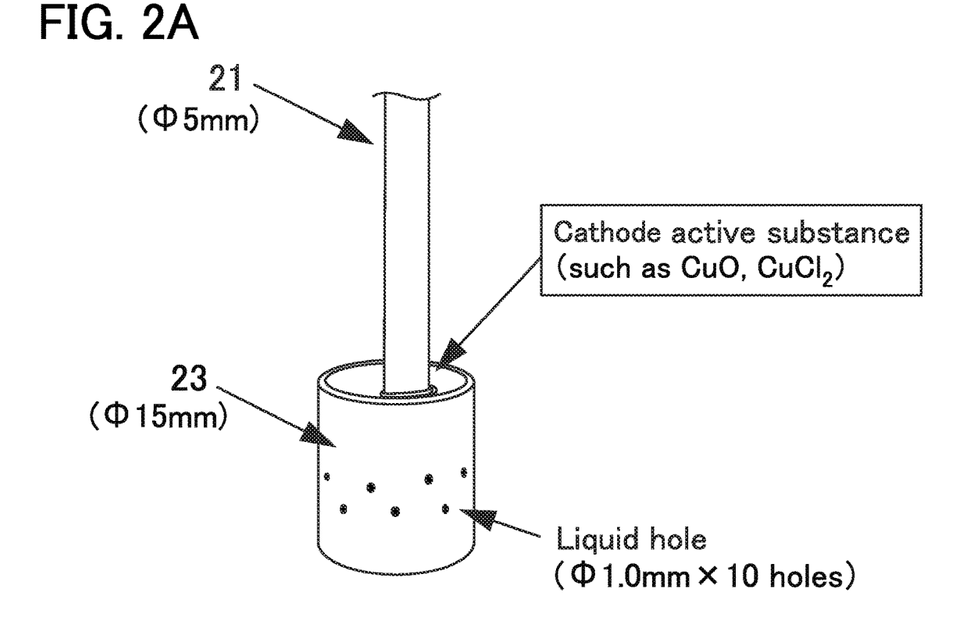
FIG. 2A is a photograph showing an example of a cathode and an encircling body.
Figure 2B:
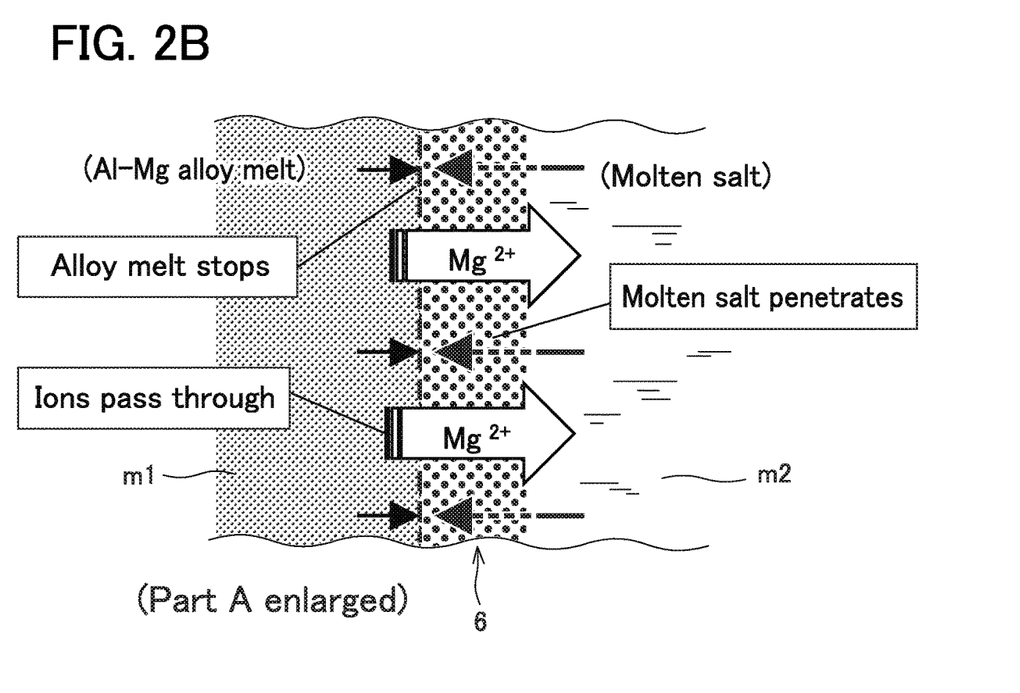
FIG. 2B is an enlarged explanatory view of a part (part A) of a porous container body.

The separator may be preferably composed of a porous body having heat resistance. For example, an unglazed container body such as a porous crucible can be used as the separator. As illustrated in FIG. 2B, such a separator allows ions (including the molten salt) to pass through, but does not allow the melt to pass through.

«Container Body»

The Al alloy melt and the molten salt may be contained in one container body or may otherwise be contained in respective divided or independent container bodies. The container body may be made of ceramics or metal. The Al alloy melt may be contained in a porous container body capable of ionic conduction (passage), and the above-described separator may be omitted.

«Monitoring Means»

The power generation apparatus of the present invention uses the redox reaction (electron transfer at the electrodes), and therefore the amount of energization (electrical quantity) between the electrodes can be approximately proportional to the amount of a reactant at each electrode (Faraday's law (electrolysis law)). As such, it is also possible to perceive (monitor) the amount of a reactant on the Al alloy melt side or the molten salt side based on the amount of energization. In this regard, the power generation apparatus of the present invention may include a monitoring means that, based on the amount of energization between the anode and the cathode, perceives the amount of a reactant caused by the anode reaction and/or the cathode reaction. The monitoring means may comprise, for example, a calculation means for the amount of a reactant and a display means for the calculated amount of the reactant. The value to be monitored of a reactant may be the amount of metal element (such as Mg) that is removed from/reduced in the Al alloy melt side or may otherwise be the amount of metal element (such as Cu) that is deposited or precipitated on the molten salt side.

Calculation of the amount of a reactant is performed, for example, as follows. Assuming that the amount of current in an external circuit is I (A) and the energization time is t (sec), the electrical quantity is represented by Q=It (C). Then, assuming that the Faraday constant F is 96485 (C/mol), the molar mass is B (g), and the ionic valence of a reactant is z, the amount of reactant is obtained as m=BQ/zF (g)=BIt/zF (g).

When the voltage between the electrodes (between the terminals) is E (V), the amount of power generation is presented by P=EIt (J), and the amount of reactant is also obtained as m=BP/EzF (g).

Examples

A power generation apparatus capable of power generation using an Al alloy melt and a molten salt was manufactured, and the applicability to power generation and the amount of reactants caused by the power generation were evaluated. The present invention will be described in more detail based on such a specific example.

«Tower Generation Apparatus»

Figure 1:
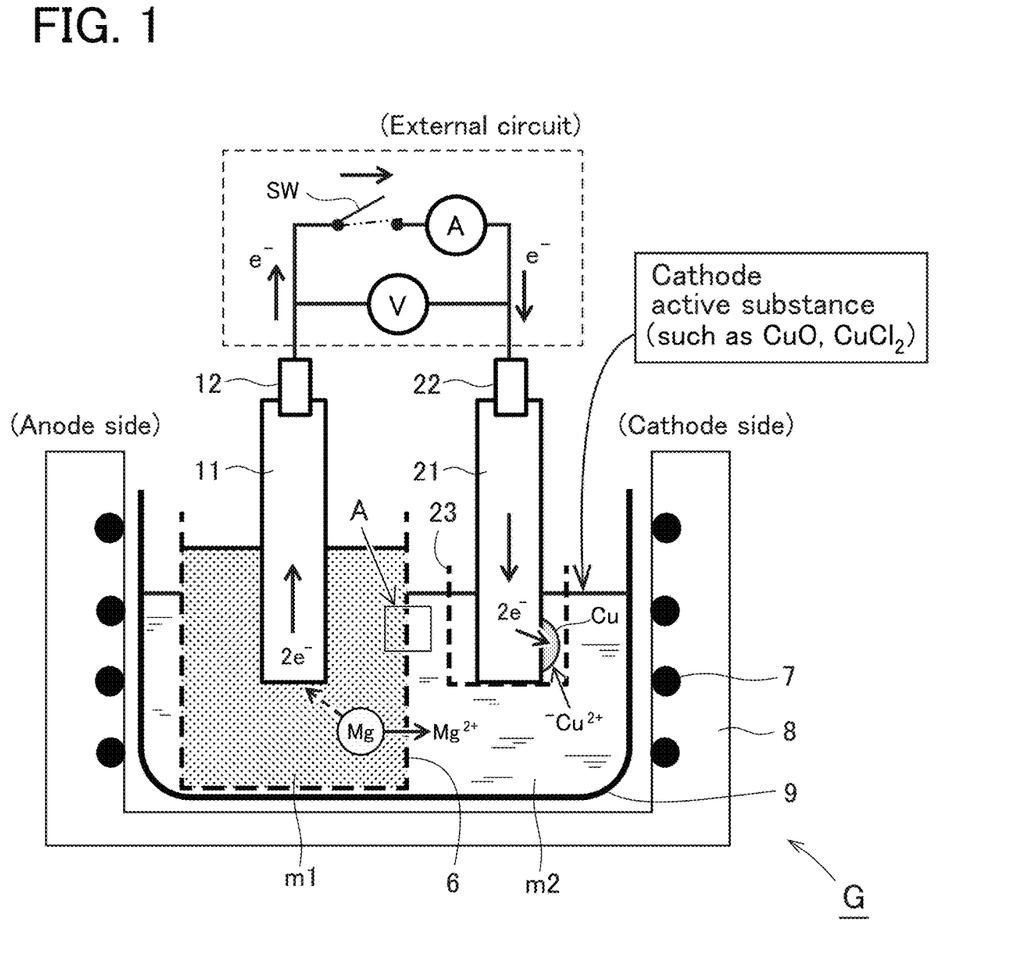
FIG. 1 is a schematic view illustrating an example of a power generation apparatus.

The outline of a power generation apparatus G manufactured is schematically illustrated in FIG. 1. The power generation apparatus G comprises an anode 11, an anode terminal 12, a cathode 21, a cathode terminal 22, an encircling body 23 (enclosure/supply means), a porous container body 6 (separator), a heater 7, a holding furnace 8, and a liquid bath 9 (container body). The power generation apparatus G is connected to an external circuit, and the external circuit is provided with an ammeter A, a voltmeter V, and a switch SW.

The anode 11 and the cathode 21 are each composed of a graphite current collector (graphite electrode). The anode terminal 12 attached to the upper end of the anode 11 and the cathode terminal 22 attached to the upper end of the cathode 21 are composed of copper. The encircling body 23 has a bottomed cylindrical shape that covers the lower side of the cathode 21. The cylindrical side surface of the encircling body 23 is provided with a plurality of through holes (referred to as "liquid holes") through which liquid can pass. The bottom portion of the encircling body 23 and the lower end portion of the cathode 21 are integrated, and both are electrically conductive. FIG. 2A shows an example of such cathode 21 and encircling body 23. In the present example, graphite electrodes having an outer diameter of φ5 mm were used as the anode 11 and cathode 21.

The porous container body 6 has a bottomed tubular shape and contains an Al alloy melt m1 (simply referred to as a "melt m1"). The porous container body 6 is composed of entirely porous ceramics (unglazed ceramics). As illustrated in FIG. 2B, the porous container body 6 does not allow the melt m1 itself to pass through, but allows ions (e.g., $Mg^2$) in the melt m1 and ions of a molten salt m2 to pass through. In the present example, a porous crucible (special refractory crucible made of MgO/40×30×100 mm) available from NIKKATO CORPORATION was used as the porous container body 6.

The heater 7 is of an electric heating type and provided inside the holding furnace 8 composed of a heat insulating material. The liquid bath 9 accommodates the porous container body 6, which contains the melt m1, and the molten salt m2 in which the melt m1 is immersed. The temperature of the molten salt m2 in the liquid bath 9 was maintained constant by the heater 7 and the holding furnace 8. In the present example, a dense crucible (made of alumina/SSA-H•B5) available from NIKKATO CORPORATION was used as the liquid bath 9.

«Experiments»

Using the power generation apparatus G illustrated in FIG. 1, removal of the metal element (anode active substance) contained in the melt m1 (purification or concentration adjustment of the Al alloy melt) and deposition or precipitation of the metal element (cathode active substance) added to the molten salt m2 was performed in parallel to the power generation as follows.

1. Raw Materials (1) Al Alloy Melt

Al—Mg alloy melt (melt m1) was prepared using commercially available pure Al and pure Mg. At that time, the assumption was made for a case of purifying the aluminum alloy melt through removing Mg (impurities) from a raw melt obtained by melting the scrap to be recycled.

The initial concentration of Mg (anode active substance) with respect to the entire melt was 0.85% or 1.31%. In the present example, unless otherwise stated, the concentration is indicated by mass ratio (mass %). The amount of melt prepared was about 80 g or about 100 g.

(2) Molten Salt

Using commercially available chloride (reagent), the molten salt m2 of KCl-43% NaCl-1.4% MgCl was prepared.

(3) Cathode Active Substances

CuO, $CuCl_2$, and CuCl were prepared as cathode active substances (raw materials for power generation on the cathode side). The ionic valence of Cu in CuO and $CuCl_2$ is 2 while the ionic valence of Cu in CuCl is 1. Each molar mass is CuO: 79.545, $CuCl_2$: 134.45, CuCl: 98.999. Therefore, in the case of CuO: 1 g, $CuCl_2$: 1.7 g, and CuCl: 2.5 g, for example, the electrochemical equivalents are approximately the same.

2. Power Generation

The heater 7 was operated with the switch SW turned off to maintain the above-described melt m1 and molten salt m2 at 730° C. An Al-0.85% Mg alloy melt was used as the melt m1.

After that, the switch SW was turned on, and as an example, $CuCl_2$: 1.7 g was added to the encircling body 23. The changes over time in the voltage E (V) and the current I (A) generated after the addition were continuously measured. In addition, the electrical quantity Q=It (C) and the amount of power generation P=EIt (J) when the time t (s) elapsed since the addition of $CuCl_2$ were calculated. The results thus obtained are collectively illustrated in FIG. 3.

Figure 3:
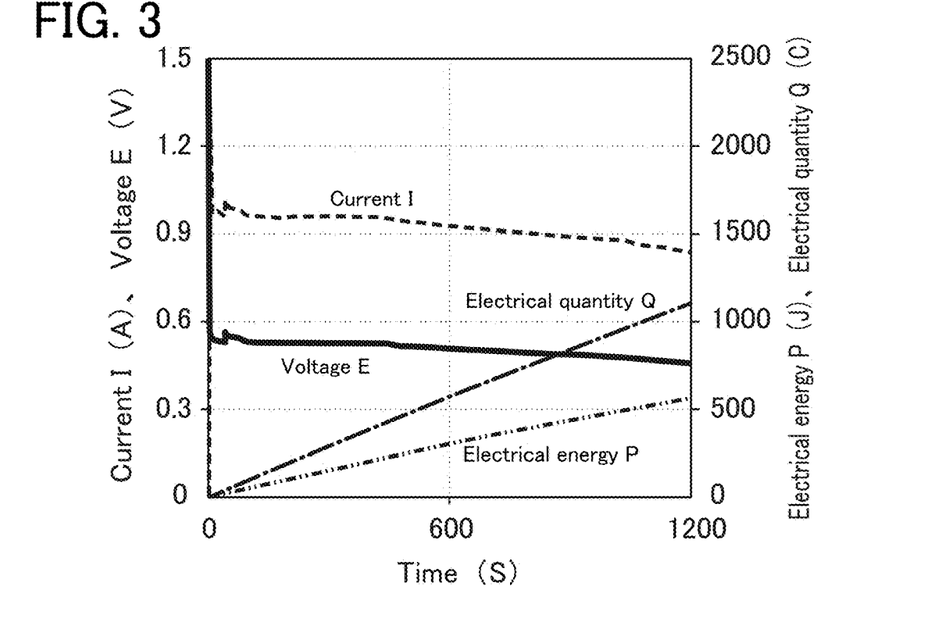
FIG. 3 is a graph illustrating an example of changes over time in the generated voltage, current, electrical quantity, and electrical energy.

As apparent from FIG. 3, it has been confirmed that the power generation apparatus G can perform DC power generation with a stable output (voltage E/current I). When the surface of the cathode 21 was observed, Cu was deposited.

3. Amount of Reactants

Using the power generation apparatus G, power generation was performed in the same manner under the conditions listed in Table 1. At that time, Al-1.31% Mg alloy melt (initial concentration) was used as the melt m1. Either CuCl: 2.5 g, $CuCl_2$: 1.7 g, or CuO: 2 g was added as the cathode active substance to the encircling body 23 in the molten salt m2. The electrochemical equivalent ratio is represented by $CuCl:CuCl_2:CuO=1:1:2$.

Each Al alloy melt after the lapse of processing time as listed in Table 1 was taken out and poured into a cylindrical mold (stainless steel analysis mold). It was naturally cooled in the air to obtain a disk-shaped casting. The chemical composition (Mg concentration) was quantitatively analyzed using fluorescent X-ray spectroscopy (XRF: X-Ray Fluorescence).

The reaction amount (analyzed value) of Mg associated with the power generation was calculated from the amount of decrease in Mg concentration obtained from this melt analysis and the initial amount of melt. The results are also listed in Table 1. In addition, the maximum reaction amount of Mg (theoretical value) obtained stoichiometrically from the additive amount of the cathode active substance and the reaction amount of Mg (calculated value) calculated based on the Faraday's law from the electrical quantity obtained by measuring the current are also listed in Table 1. Furthermore, on the basis of the results listed in Table 1, the relationship between the reaction amount of Mg determined by the melt analysis and the reaction amount of Mg measured by the electrical quantity is illustrated in FIG. 4.

Figure 4:
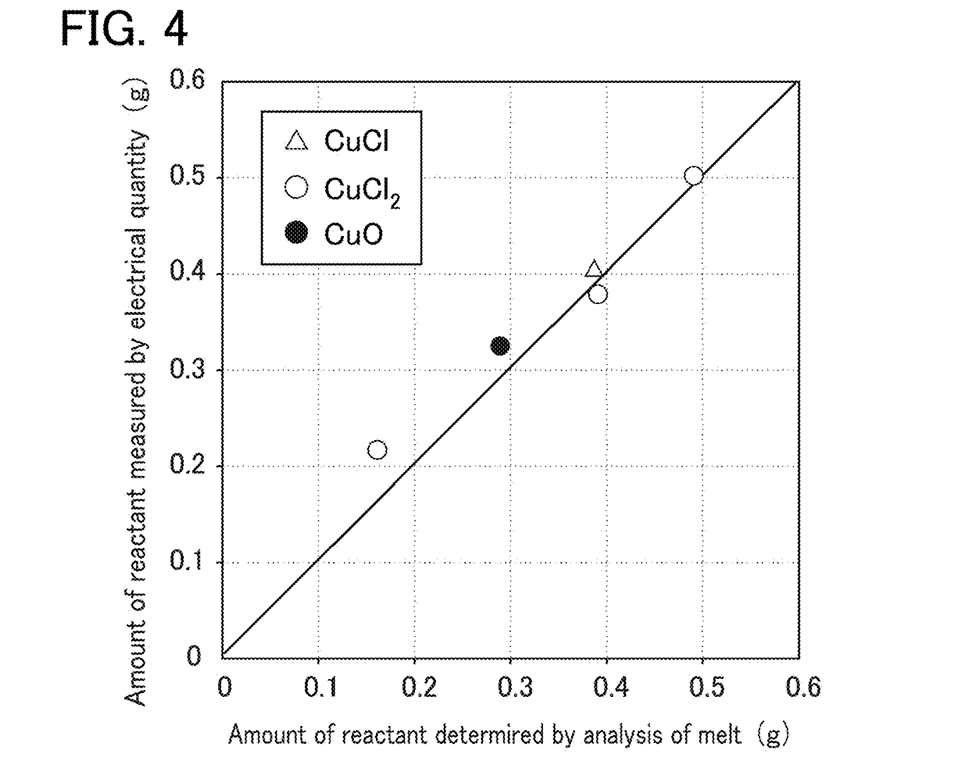
FIG. 4 is a scatter diagram illustrating the relationship between the amount of reactants determined by chemical analysis of the melt and the amount of reactants measured from the electrical quantity.

As apparent from FIG. 4, it has been confirmed that the reaction amount of Mg determined by the melt analysis and the reaction amount of Mg measured by the electrical quantity are approximately proportional to each other and in line with the Faraday's law. It has thus been found that also in the present example, the amount of reactants (such as the amount of Mg removed) can be monitored by measuring the electrical quantity (amount of energization, amount of power generation) (monitoring means).

The reason why the electrical quantity or the reaction amount determined by the melt analysis is larger than the theoretical value (maximum value) based on the additive amount listed in Table 1 is that a part of Mg in the Al melt reacts with the air and is consumed due to oxidation.

From the above, it has been confirmed that according to the power generation apparatus (power generation method) of the present invention, stable power generation can be performed using the Al alloy melt, which contains the anode active substance, and the molten salt, which contains the cathode active substance. It has also been confirmed that the purification of the Al alloy melt (including adjustment of the concentration of contained metal elements) can be performed in parallel to the power generation. Furthermore, it has also been confirmed that the amount of reactants generated at that time can be monitored by measuring the electrical quantity associated with the power generation.

Modification Example

Figure 5:
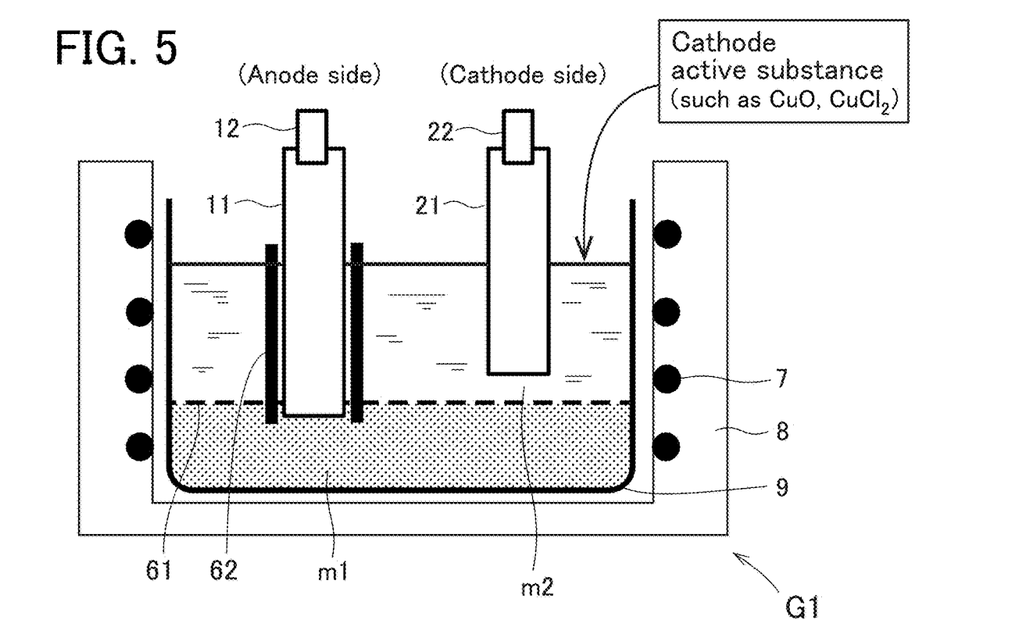
FIG. 5 is a schematic diagram illustrating a modified example of the power generation apparatus.

FIG. 5 illustrates a power generation apparatus G1 in which a part of the power generation apparatus G is modified. The previously described members and the like are denoted by the same reference numerals or characters, and the description thereof will be omitted as appropriate.

The power generation apparatus G1 includes a porous plate 61 (separator) as substitute for the porous container body 6. The porous plate 61 separates the melt m1 and the molten salt m2 into two lower and upper layers, respectively. The porous plate 61 is also composed of porous ceramics like the porous container body 6 (see FIG. 2B).

The lower-upper relationship between the melt m1 and the molten salt m2 depends on their densities. Therefore, the melt m1 may be the upper layer. As illustrated in FIG. 5, when the melt m1 is the lower layer, it is preferred to provide an insulating tube 62 on the outer peripheral surface side of the anode 11 so that the anode 11 does not come into contact with the molten salt m2. This can prevent the cathode active substance (such as $Cu^{2+}$) contained in the molten salt m2 from being directly deposited on the surface of the anode 11, and the power generation efficiency is improved. The power generation itself is possible even when one or both of the porous plate 61 and the insulating tube 62 are absent.

TABLE 1

| | Conditions of power generation | | | | Reaction amount of Mg (g) | | |
|---|---|---|---|---|---|---|---|
| Sample No. | Amount of Al—Mg alloy melt (g) | Cathode active substance | | Processing time (s) | Electrical quantity (C) | Theoretical value based on additive amount | Calculated value measured by electrical quantity | Analyzed value determined by melt analysis |
| | | Type | Additive amount (g) | | | | | |
| 1 | 80.6 | CuCl | 2.5 | 2396.5 | 1659.7 | 0.307 | 0.405 | 0.387 |
| 2 | 100.2 | $CuCl_2$ | 1.7 | 925.5 | 644.2 | 0.307 | 0.218 | 0.160 |
| 3 | 100.0 | | | 2227.5 | 1488.3 | 0.307 | 0.379 | 0.390 |
| 4 | 100.0 | | | 3298.5 | 2271.1 | 0.307 | 0.502 | 0.490 |
| 5 | 80.0 | CuO | 2.0 | 2743.0 | 956.6 | 0.611 | 0.325 | 0.288 |

Initial concentration of Mg in melt: 1.31%

DESCRIPTION OF REFERENCE NUMERALS

G Power generation apparatus
m1 Al alloy melt
m2 Molten salt
11 Anode
21 Cathode
6 Porous container body (Separator)
9 Liquid bath (Container body)

The invention claimed is:

1. A power generation apparatus comprising:
a container body configured to contain an aluminum alloy melt and a molten salt that is in a liquid junction with the aluminum alloy melt;
an anode configured to be in contact with the aluminum alloy melt and not in contact with the molten salt;
a cathode configured to be in contact with the molten salt and not in contact with the aluminum alloy melt, the power generation apparatus including an encircling body at one end of the cathode, the encircling body having a plurality of through holes, wherein
DC power is obtained from between the anode and the cathode by an anode reaction on the aluminum alloy melt side and a cathode reaction on the molten salt side.

2. The power generation apparatus according to claim 1, further comprising
a separator that separates the aluminum alloy melt and the molten salt from each other while allowing ionic conduction between the aluminum alloy melt and the molten salt.

3. The power generation apparatus according to claim 1, wherein the anode or the cathode is electrically insulated from the molten salt or the aluminum alloy melt.

4. The power generation apparatus according to claim 1, wherein the cathode is provided with a supply means that supplies a raw material to a periphery of the cathode, the raw material causing the cathode reaction.

5. The power generation apparatus according to claim 1, further comprising
a monitoring means that, based on an amount of energization between the anode and the cathode, perceives an amount of a reactant caused by the anode reaction and/or the cathode reaction.

6. The power generation apparatus according to claim 1, wherein the power generation apparatus serves also as a melt processing apparatus that performs removal or concentration adjustment of an element contained in the aluminum alloy melt.

7. The power generation apparatus according to claim 1, wherein ionic species transmitted during the anode reaction include $Mg^{2+}$.

8. A power generation method comprising:
preparing an aluminum alloy melt and a molten salt that are in a liquid junction with each other; and
individually providing a first electrode in contact with the aluminum alloy melt and not in contact with the molten salt and a second electrode in contact with the molten salt and not in contact with the aluminum alloy melt, the second electrode being a cathode, and an encircling body being at one end of the cathode, the encircling body having a plurality of through holes,
wherein DC power is obtained by an anode reaction on the aluminum alloy melt side and a cathode reaction on the molten salt side.

9. The power generation method according to claim 8, wherein the molten salt contains a nobler metal element than Al.

10. The power generation method according to claim 9, wherein the nobler metal element is one or more of Cu, Zn, or Mn.

11. The power generation method according to claim 9, wherein the nobler metal element is supplied as an oxide or a halide to the molten salt.

12. The power generation method according to claim 8, wherein the molten salt is composed of a halide.

13. The power generation method according to claim 8, wherein at least a part of a raw material of the aluminum alloy melt is scrap.

14. The power generation method according to claim 8, wherein the power generation method serves also as a purification method of removing impurities from the aluminum alloy melt.

15. The power generation method according to claim 8, wherein ionic species transmitted during the anode reaction include $Mg^{2+}$.

* * * * *

UNITED STATES PATENT AND TRADEMARK OFFICE
CERTIFICATE OF CORRECTION

| | | |
|---|---|---|
| PATENT NO. | : 12,003,002 B2 | Page 1 of 1 |
| APPLICATION NO. | : 17/347965 | |
| DATED | : June 4, 2024 | |
| INVENTOR(S) | : Jun Yaokawa et al. | |

It is certified that error appears in the above-identified patent and that said Letters Patent is hereby corrected as shown below:

On the Title Page

In item (73):
Delete "Nabushiki"
Insert --Nagakute--

Signed and Sealed this
Thirtieth Day of July, 2024

Katherine Kelly Vidal
*Director of the United States Patent and Trademark Office*